(12) United States Patent
Carroll

(10) Patent No.: US 6,762,777 B2
(45) Date of Patent: *Jul. 13, 2004

(54) SYSTEM AND METHOD FOR ASSOCIATING POPUP WINDOWS WITH SELECTIVE REGIONS OF A DOCUMENT

(75) Inventor: Michael Carroll, Westford, MA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,310

(22) Filed: Dec. 22, 1999

(65) Prior Publication Data

US 2003/0160807 A1 Aug. 28, 2003

(51) Int. Cl.[7] .................................................. G09G 5/00
(52) U.S. Cl. ........................ 345/808; 345/711; 345/760
(58) Field of Search ................................. 345/711, 808, 345/705–710, 712–715, 760; 707/501.1, 512, 513

(56) References Cited

U.S. PATENT DOCUMENTS

| | | | |
|---|---|---|---|
| 2,496,606 A | | 2/1950 | Smith |
| 4,710,885 A | | 12/1987 | Litteken |
| 5,253,362 A | * | 10/1993 | Nolan et al. ................. 345/781 |

(List continued on next page.)

OTHER PUBLICATIONS

"Cascading Style Sheets in Internet Explorer," pp. 1–24; http://www.microsoft.com/workshop/author/css/css–ie4.asp, Printed on Mar. 26, 1999.

"The Definitive Guide", Chapter 10, pp. 1–13; http://www.ora.com/www/info/html/ch10.html, Printed on Mar. 26, 1999.

"Frames", pp. 1–3; http://www.iwaynet.net/~rtyler/htmltutorial/frames.html, Printed on Mar. 26, 1999.

Data Koncepts Advanced HTML–Frames!, pp. 1–8; http://www.wave.co.nz/pages/dklynn/frames.html, Printed on Mar. 26, 1999.

"Introduction to Frames", pp. 1–12; http://www.w3.org/TR/REC–html40/present/frames.html, Printed on Mar. 26, 1999.

"HTML Tag Quick Reference Guide," pp. 1–5; http://www.projectcool.com/developer/reference/tag–table.html, Printed on Mar. 26, 1999.

Young, "Cascading Style Sheets in Internet Explorer 4.0" plus Examples, http://msdn.microsoft.com/library/en–us/dnie40/html/css–ie4.asp, updated Oct. 15, 1997, 26 pages.

Netscape Screen Shot, Netscape Communicator 4.03 [fr], Copyright 1994–1997, 3 pages.

Cascading Style Sheets, Level 2, CSS2 Specification, W3C Recommendation May 12, 1998, http://www.w3.org/TR/REC–CSS2/css2.pdf, pp. 1–338.

HTML 4.0 Specification, W3C Recommendation, revised on Apr. 24, 1998, http://www.w3.org/TR/1998/REC–html40–19980424/html40.pdf, 27 pages.

*Primary Examiner*—Sy D. Luu
(74) *Attorney, Agent, or Firm*—Mintz Levin Cohn Ferris Glovsky and Popeo PC

(57) ABSTRACT

A system and method processes designating regions in an electronic text to associate with those selected regions freely editable popup windows. In a preferred embodiment, embedded tag delimiters are used to mark out the boundaries of the selected region and the content of the popup window. In an alternative embodiment, keystroke combinations are utilized to associate a selected region in an electronic document with a popup window, and the popup window is then freely editable.

16 Claims, 4 Drawing Sheets

U.S. PATENT DOCUMENTS

| | | |
|---|---|---|
| 5,287,448 A | 2/1994 | Nicol et al. |
| 5,345,550 A | 9/1994 | Bloomfield |
| 5,428,733 A | 6/1995 | Carr |
| 5,434,965 A | 7/1995 | Matheny et al. |
| 5,475,805 A | 12/1995 | Murata |
| 5,544,288 A | 8/1996 | Morgan et al. |
| 5,557,722 A | 9/1996 | DeRose et al. |
| 5,559,942 A | 9/1996 | Gough et al. |
| 5,596,700 A * | 1/1997 | Darnell et al. .............. 345/781 |
| 5,602,997 A | 2/1997 | Carpenter et al. |
| 5,630,080 A | 5/1997 | Malamud et al. |
| 5,644,776 A | 7/1997 | DeRose et al. |
| 5,675,520 A | 10/1997 | Pitt, III et al. |
| 5,694,610 A | 12/1997 | Habib et al. |
| 5,742,768 A * | 4/1998 | Gennaro et al. .................. 1/1 |
| 5,748,927 A | 5/1998 | Stein et al. |
| 5,778,404 A | 7/1998 | Capps et al. |
| 5,781,714 A | 7/1998 | Collins et al. |
| 5,802,388 A | 9/1998 | Zetts et al. |
| 5,805,167 A | 9/1998 | van Cruyningen |
| 5,821,932 A | 10/1998 | Pittore |
| 5,835,914 A | 11/1998 | Brim |
| 5,845,075 A | 12/1998 | Uhler et al. |
| 5,845,119 A | 12/1998 | Kozuka et al. |
| 5,860,073 A | 1/1999 | Ferrel et al. |
| 5,870,549 A | 2/1999 | Bobo, II |
| 5,870,768 A | 2/1999 | Hekmatpour |
| 5,874,962 A | 2/1999 | de Judicibus et al. |
| 5,937,417 A * | 8/1999 | Nielsen ...................... 345/711 |
| 6,041,335 A * | 3/2000 | Merritt et al. .............. 707/512 |
| 6,073,136 A * | 6/2000 | Bertram et al. ............. 345/784 |
| 6,092,081 A * | 7/2000 | Alpert et al. ............ 707/104.1 |
| 6,128,655 A | 10/2000 | Fields et al. |
| 6,209,006 B1 * | 3/2001 | Medl et al. ................. 345/705 |
| 6,230,169 B1 * | 5/2001 | Nagae ........................ 707/512 |
| 6,230,170 B1 * | 5/2001 | Zellweger et al. .......... 345/467 |
| 6,262,728 B1 * | 7/2001 | Alexander ............... 345/440.1 |
| 6,681,368 B1 | 1/2004 | Kawabata ................ 715/501.1 |

* cited by examiner

SYSTEM AND METHOD FOR ASSOCIATING POPUP WINDOWS WITH SELECTIVE REGIONS OF A DOCUMENT

FIELD OF THE INVENTION

This application claims priority based on U.S. Provisional Patent Application Serial No. 60/114,575, entitled "System and Method for Associating Popup Windows with Selective Portions of a Document," filed Dec. 31, 1998.

BACKGROUND OF THE INVENTION

The widespread acceptance of modern word processing systems has increased the demand for text manipulation features. One common and even expected feature on word processing packages and other software applications is the ability to highlight, underscore or otherwise mark regions of text out of an electronic document. The marked region can be made to stand out for emphasis, linkage to network sites, or for other purposes.

One textual markup feature that is useful in some presentations is a popup window, that is, a section of text which appears when a cursor or other onscreen locator hovers over a predetermined section of text. This feature is used in Help menus and toolbars, for example, in which a small upper block of text appears when a given subject or section is hovered over, adding comments or expanding a description of that section. However in available word processing technologies, there is no ability to insert or edit popup windows freely within documents. Other drawbacks exist. More powerful document annotation technology is desirable.

SUMMARY OF THE INVENTION

The invention overcoming these and other problems in the art relates to a system and method for associating popup windows with selected regions of a document. The invention permits a user to take a highlighted or otherwise selected region within an electronic document and append or attach to it a popup window with embedded information of a desired type, for display when the document is subsequently viewed in that section. This is accomplished in part by employing freely movable popup delimiter tags, which can be positioned and re-positioned within a document to highlight the enclosed information and associate with that information a popup message, graphic or other information.

An object of the invention is to provide a system and method that allows users to select highlighted regions of electronic documents to insert freely editable popup windows.

Another object of the invention is to provide a system and method that allows user to create more flexible and information-rich documents.

DETAILED DESCRIPTION OF PREFERRED EMBODIMENTS

The invention will be described with respect to a workstation 120 at which a user processes an electronic text 108. Workstation 120 includes a display screen 102, such as a computer display screen, which displays electronic text 108. Display screen can be a CRT, LCD or other type of computer or other display. Workstation 120 includes a central processing unit 110, which may contain a controller operating under programmed control, storage and memory connected by an electronic bus and related circuitry (not shown) that will be appreciated by persons skilled in the art. Workstation 120 for instance can be a personal computer running the Microsoft Windows™95, 98 or NT™ operating systems, or Linux, Unix or other operating systems.

Figure 1:
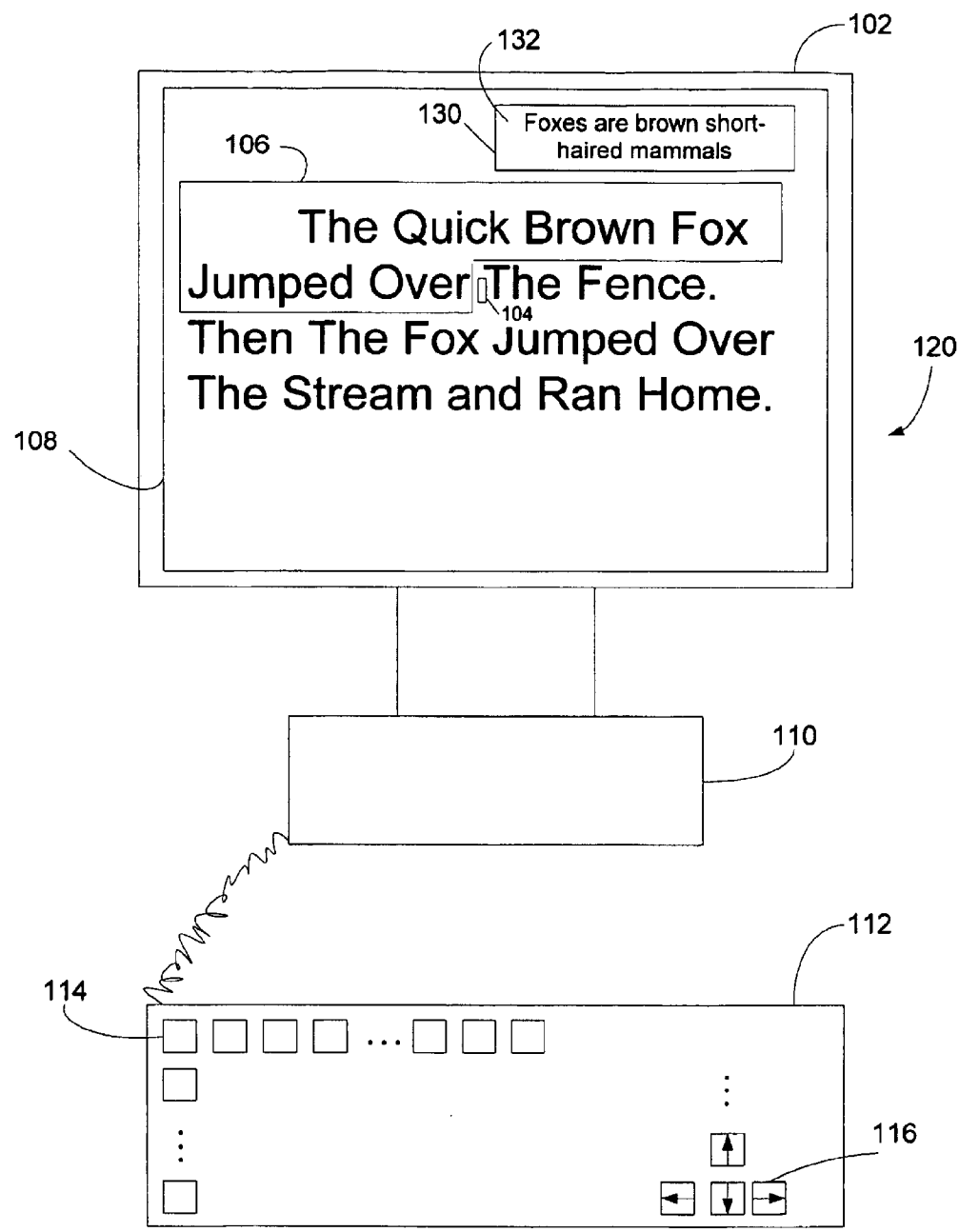
FIG. 1 is an illustration of a computer workstation processing an electronic document according to the invention.

Display 102 displays the electronic text 108 to the user and receives input from the user to manipulate the text and its characteristics. In the embodiment illustrated in FIG. 1, the input devices to the central processing unit 110 include a keyboard 112, although it will be appreciated that other types of input devices, such as mice, trackballs, microphones with speech to text converters and others are contemplated for use by the invention. Keyboard 112 includes a set of keys 114, including a set of alphanumeric keys such as the QWERTY keyboard, and cursor arrow keys 116. Cursor arrow keys 116 have arrows indicating directions marked on them, and striking those keys cause a cursor 104 displayed on display 102 to move in a corresponding direction, as understood by persons skilled in the art.

In a preferred embodiment, the selected text is highlighted and, with a series of keystrokes or menu or icon selections, a popup window is associated with the selected text. An example of this embodiment is provided in FIG. 1. In the electronic text 108, the user has highlighted a region of the text as highlighted region 106. Highlighted region 106 may be shown on display 102 in a different color, in a different intensity or otherwise displayed as a distinct region within electronic text 108. Alternatively, the highlighted region could have the same appearance as a non-highlighted region. In the illustrated embodiment, the user wishes to append a popup window 130 to the highlighted region 106. Cursor 104, which may be a blinking or solid bar, arrow or other onscreen marker is located two words from the end of the sentence, in the illustration.

In a preferred embodiment, the association of the popup window 130 to the highlighted region 106 is executed by first striking a predetermined set of keystroke or keystrokes on keys 114, to initiate the popup processing. That set of keystrokes might be, for example, the depression of the "Control" key and holding that key down while hitting the "P" key, for popup. Once the predetermined set of keystrokes is input, the cursor 104 may be automatically shifted to an upper screen area called the display popup window 130 above the highlighted region 106. Within the confines of popup window 130, the user can keyboard a textual messages or other popup information region 132 to be presented whenever the document is viewed and the cursor comes within a predetermined relationship with the highlighted region 106. The popup information region 132 may include network linkages such as Internet URLs (Universal Resource Locator), graphical or other information.

Figure 2:
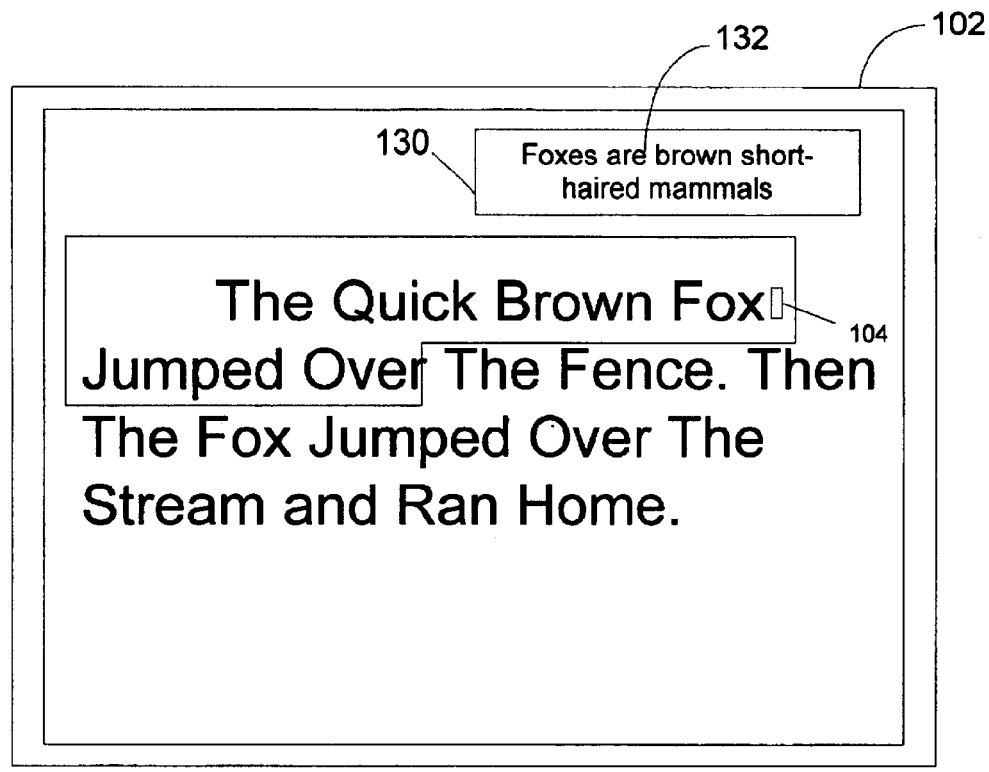
FIG. 2 is an illustration of an electronic document in which a highlighted region has a popup window associated with it, according to the invention.

When the user has finished inputting the popup information region 132 that he or she desires, then the user strikes a second set of predetermined keystrokes to indicate that the popup information region 132 is complete and processing is at a point in which termination of the popup operation is desired. This second set of keystrokes may be the same Control/P keystroke as the first set, or another according to particular implementations. Upon entry of the second set of predetermined keystrokes, display 102 displays electronic text 108 in the form shown in FIG. 2. In this state, the highlighted region of electronic text 108, when hovered over by cursor 104, now displays popup window 130 with popup information region 132 above the regular textual content, in balloon fashion. When cursor 104 then moves outside the boundary of highlighted region 106, popup window 130 disappears.

It is also anticipated that the invention can be implemented without the use of highlighted text. For example, a form that is a digital replication of a paper form could have hidden links associated with selected text for detailed explanation of the selected text. It is also anticipated that the popup window could require some action in addition to a predetermined relationship between the cursor and the selected text. For example, the cursor could change appearance once the predetermined relationship between the cursor and the selected text was established. Then, upon an additional user input, such as the clicking of a mouse key, the popup window could be presented to the user.

Figure 3:
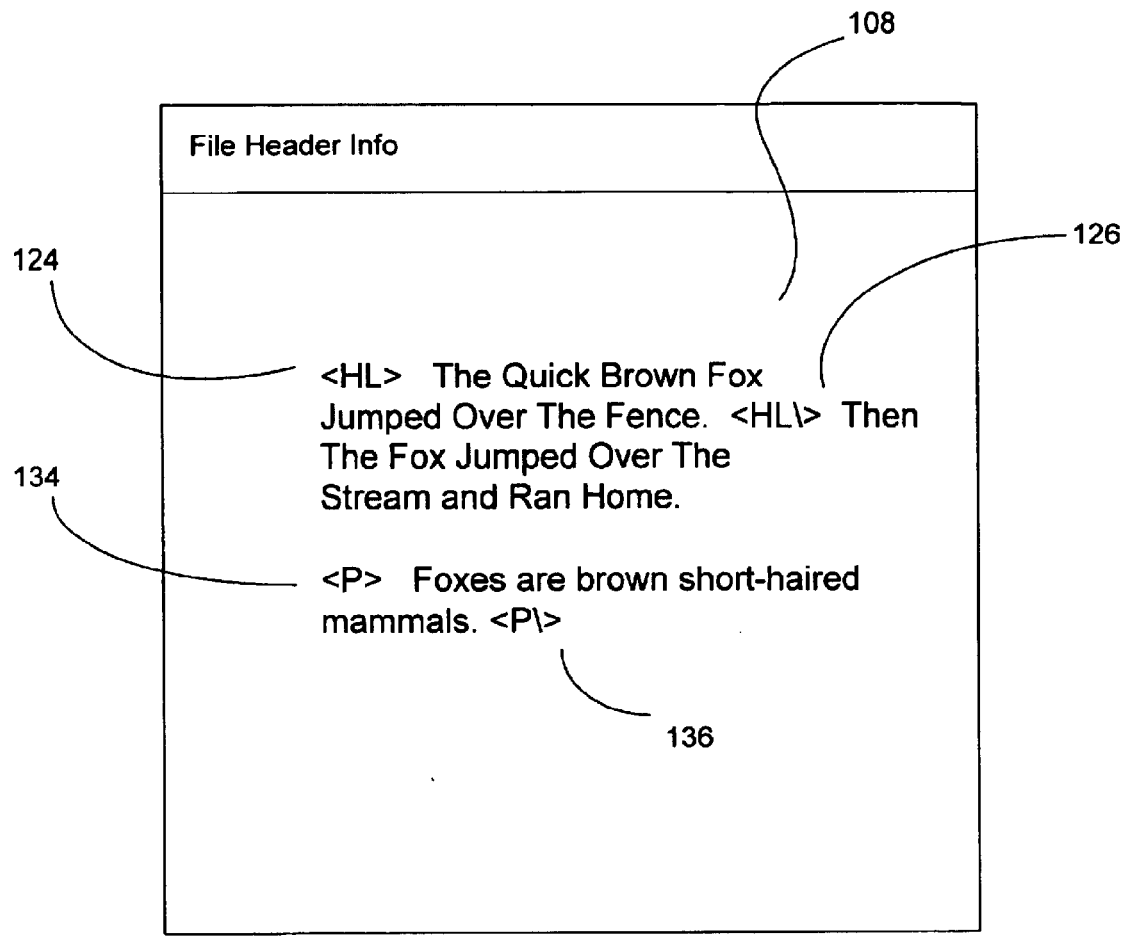
FIG. 3 is an illustration of embedded delimiter tags within the electronic document processed according to the invention.

As illustrated in FIG. 3, in one embodiment the activation of the first set of keystrokes to execute the selective highlighting of the invention works to modify a pair of embedded delimiter tags 124 and 126. Embedded delimiter tag 124 is shown as a begin tag, while embedded delimiter tag 126 is shown as an end tag, and each is shown in Hyper Text Markup Language (HTML) format. It will be appreciated however that other types of document delimiters and conventions for highlighting are contemplated. Associated with embedded delimiter tags 124 and 126 are popup delimiter tags 134 and 136 which mark the beginning and end of the popup information region 132 stored in an electronic file along with the other tags and regular text, graphical and other data.

Upon the inputting of the popup information region 132 by the user, the popup end tag 136 is stored indicating an end to that content. Modifications to the highlighted region 106 can be performed, as well as to the popup information region 132, by invoking the same predetermined keystroke combinations.

The invention also contemplates the preparation and storage of computer software in a machine-readable format such as a floppy or other magnetic, optical or other drive, which upon execution carries out the selective highlight actions of the invention.

Figure 4:
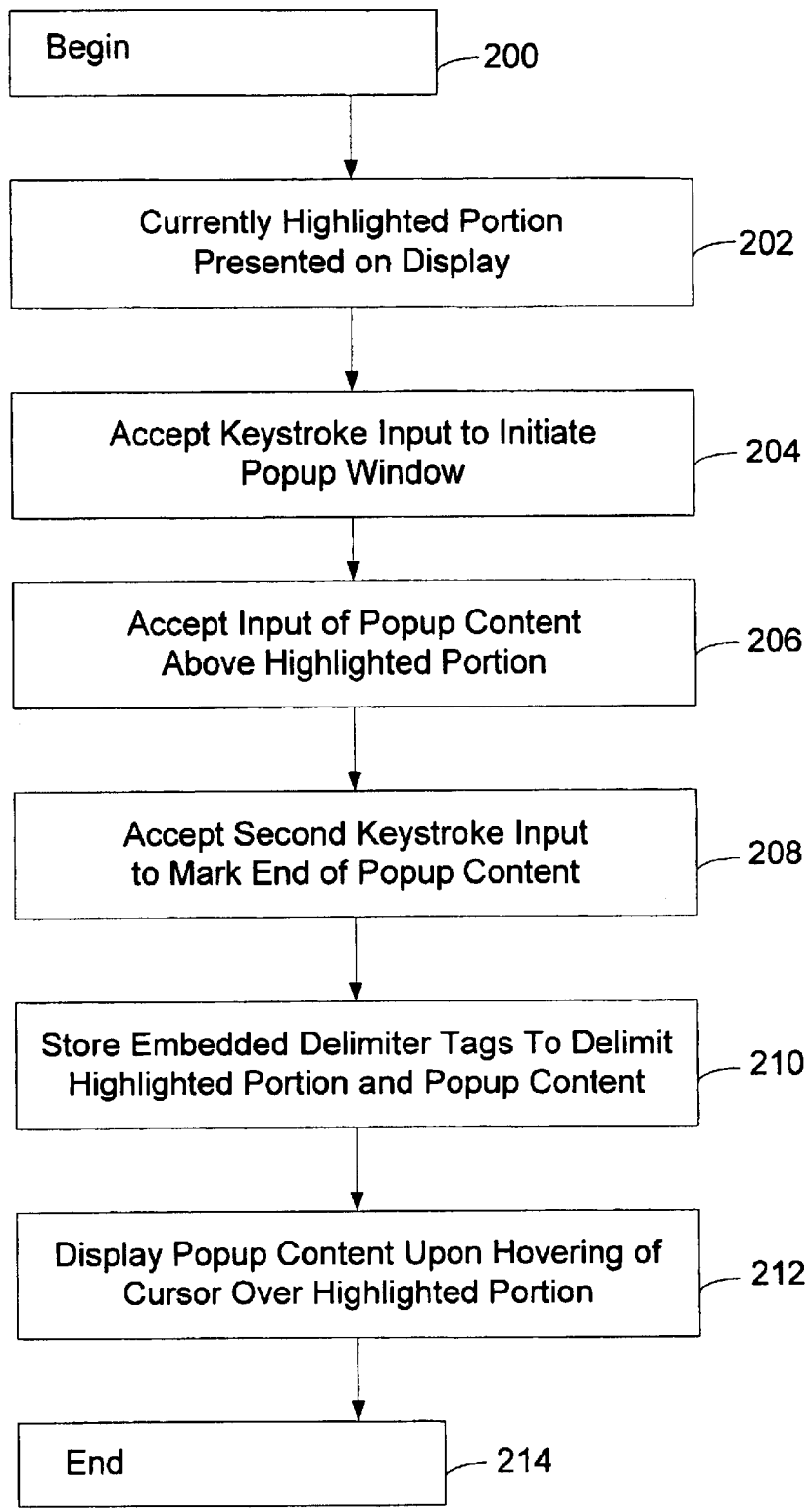
FIG. 4 is a flowchart illustrating the processing of popup windows according to the invention.

FIG. 4 illustrates processing steps carrying out the selective highlighting action of the invention. Processing begins in step 200. In step 202, the currently highlighted region is presented on display 102. Keystroke input is accepted in step 204 to initiate a popup attachment to the highlighted region, such as Control/P. In step 206, keyboard input is accepted to enter the popup information region 132 above the highlighted region 106. In step 208, second keystroke input is accepted to confirm and mark the end of the popup information region. In step 210, the embedded delimiter tags including the popup delimiter tags are stored to reflect the new popup information region. In step 212, the popup window 130 is displayed upon hovering of the cursor or other onscreen marker above the highlighted region 106. In step 214, processing ends.

The foregoing description of the system and method of the invention is illustrative, and variations in configuration and implementation will occur to persons skilled in the art. For instance, while the attachment of the popup window and content to the highlighted region has been described as including inputting of text, other information such as graphical information, URL or other network links, sound or graphic files can also be appended to the popup window 130. It is similarly contemplated that the popup could be a dynamic display, having a scripting agent that provides the resulting popup display based upon a variety of factors, including a user profile.

The attachment of a popup window can also be adapted to operate on footnotes, headers and other special areas of electronic text 108. Moreover popup windows can be applied to areas of documents which are not necessarily text, such as scanned-in drawings or other graphical areas. Yet further, while the invention has been described as associating a single popup window with a highlighted area, two or more popup windows could be associated with a given area, and popup windows can be nested (popups on popups) if desired. The scope of the invention is intended to be limited only by the following claims.

What is claimed is:

1. A method of associating a selected region of an electronic document with a popup window having a popup information region, the method comprising the steps of:

selecting at least one of a text and graphical region of the electronic document to establish the selected region of the electronic document;

accepting input to associate the selected region with the popup information region in the popup window;

displaying the popup information region in the popup window when a positional indicator comes within a predetermined relationship of the selected region; and enabling a user to input and edit information in the popup information region.

2. The method of claim 1, further comprising generating a begin select tag and an end select tag to select the selected region and a begin popup tag and an end popup tag to select the popup information region.

3. The method of claim 1, further comprising accepting additional input to change content of the popup information region 4. The method of claim 1, further comprising accepting additional input to modify the selected region within the electronic document.

5. The method of claim 1, wherein the electronic document comprises at least textual information.

6. The method of claim 5, wherein the electronic document comprises at least graphical information.

7. A system for associating a selected region of an electronic document with a popup window having a popup information region, the system comprising:

an input interface that is adapted to accept input for selecting at least one of a text and graphical region of the electronic document to establish the selected region of the electronic document and to enable a user to input and edit information in the popup information region; and a processor unit that is adapted to associate the popup information region with the selected region and to cause the popup information region to be displayed whenever a positional indicator comes within a predetermined relationship of the selected region.

8. The system of claim 7, wherein the processor unit generates a begin select tag and an end selected tag to select the selected region and a begin popup tag and an end popup tag to select the popup information region.

9. The system of claim 7, wherein the input interface accepts input from at least one of a keyboard, a speech to text converter, a mouse, a pressure pad and a trackball device.

10. The system of claim 7, wherein the input interface accepts additional input to modify content of the popup information region.

11. The system of claim 7, wherein the electronic document comprises at least textual information.

12. The system of claim 7, wherein the electronic document comprises at least graphical information.

13. A computer readable medium having computer readable program code embodied therein for associating a selected region of an electronic document with a popup window having a popup information region, the computer readable medium comprising:

computer readable program code for causing a computer to accept input for selecting at least one of a text and graphical region of the electronic document to establish the selected region of the electronic document and to enable a user to input and edit information in the popup information region;

computer readable program code for causing the computer to associate the selected region with the popup information region in the popup window; and computer readable program code for activating the popup window when a positional indicator comes within a predetermined relationship of the selected region.

14. A system for associating a popup window with a selected region of an electronic document, comprising:

input means for selecting at least one of a text and graphical region of the electronic document to establish the selected region of the electronic document and for enabling a user to input and edit information in the popup information region;

processor means for associating the popup information region with the selected region; and display means for displaying the popup window having the popup information region whenever a positional indicator comes into a predetermined relationship with the selected region.

15. The method of claim 14, wherein the processor means generates a begin select tag and an end select tab for selecting the selected region and a begin popup tag and an end popup tag for selecting the popup information region.

16. The system of claim 14, wherein the input means accepts further input for changing the content of the popup information region.

* * * * *

UNITED STATES PATENT AND TRADEMARK OFFICE
CERTIFICATE OF CORRECTION

PATENT NO. : 6,762,777 B2  Page 1 of 1
DATED : July 13, 2004
INVENTOR(S) : Michael Carroll It is certified that error appears in the above-identified patent and that said Letters Patent is hereby corrected as shown below:

<u>Title page,</u>
Insert Item [60],
-- Related U.S. Application Data

[60]  Provisional application No. 60/114,575, filed on December 31, 1998. --

Signed and Sealed this

Thirty-first Day of August, 2004

JON W. DUDAS
*Director of the United States Patent and Trademark Office*